United States Patent [19]
Borom

[11] 3,822,601
[45] July 9, 1974

[54] PNEUMATIC ANALOGUE DECOMPRESSION INSTRUMENT

[75] Inventor: Marcus P. Borom, Schenectady, N.Y.

[73] Assignee: General Electric Company, Schenectady, N.Y.

[22] Filed: Feb. 16, 1973

[21] Appl. No.: 333,220

[52] U.S. Cl.................... 73/432 R, 55/158, 210/321
[51] Int. Cl.............................................. G06g 5/00
[58] Field of Search .......... 73/432; 55/158; 210/321

[56] References Cited
UNITED STATES PATENTS

| | | | |
|---|---|---|---|
| 3,416,985 | 12/1968 | Dounoucos............................ | 55/158 |
| 3,429,105 | 2/1969 | Llewellyn et al. ..................... | 55/158 |
| 3,564,819 | 2/1971 | Neulander ............................ | 55/158 |
| 3,710,625 | 1/1973 | Borom .............................. | 73/432 R |

*Primary Examiner*—S. Clement Swisher
*Attorney, Agent, or Firm*—Charles T. Watts; Joseph T. Cohen; Jerome C. Squillaro

[57] ABSTRACT

In this decompression computer, the computation function is performed by a composite membrane assembly of a gas-diffusion membrane sandwiched between plastic reinforcing screens joined to the periphery of the membrane in an annular bond which also serves to gasket parts of the computer housing. An apertured metal retaining disc prevents gas pressure differential displacement of the central portion of the composite membrane.

1 Claim, 4 Drawing Figures

PATENTED JUL 9 1974 3,822,601
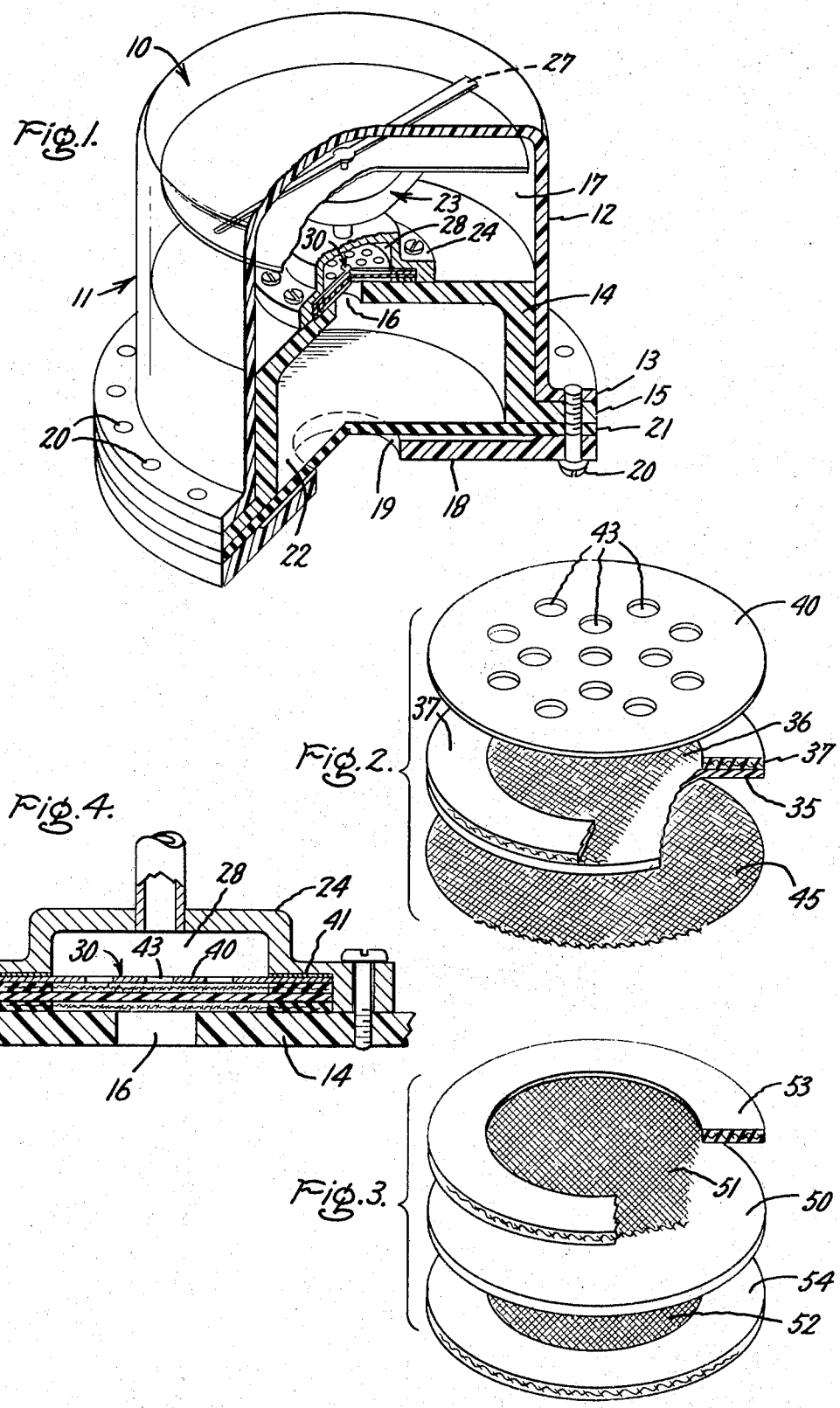

PNEUMATIC ANALOGUE DECOMPRESSION INSTRUMENT

The present invention relates generally to the art of computing decompression schedules and is more particularly concerned with a novel pneumatic analogue decompression instrument which continuously senses ambient pressures experienced during hyperbaric exposure and computes and indicates a minimum-duration safe decompression schedule.

CROSS REFERENCES

This invention is related to those of the following five patent applications assigned to the assignee hereof and filed Sept. 16, 1971:

U.S. Patent application Ser. No. 181,048, now U.S. Pat. No. 3,757,586 entitled, "Automatic Analogue Decompression Instrument," in the name of Marcus P. Borom, which discloses and claims the concept of using a permselective membrane to simulate the gas-diffusion characteristics of body tissues as they take up the gas of the breathing mixture and release it as ambient pressure varies.

U.S. Patent application Ser. No. 181,107, now U.S. Pat. No. 3,759,109 entitled, "Multi-Time Constant Pneumatic Analogue Decompression Instruments," in the names of Lyman A. Johnson and Marcus P. Borom, which discloses and claims the concept of matching different time-constants of various body tissues with membrane chambers of different diffusion controlled time-constant characteristics to provide a versatile decompression meter.

U.S. Patent application Ser. No. 181,099 now U.S. Pat. No. 3,759,108 entitled, "Single Gauge Multi-Time Constant and Multi-Tissue Ratio Automatic Decompression Instruments," in the names of Marcus P. Borom and Lyman A. Johnson, which discloses and claims the concept of connecting several different time-constant membrane assemblies in an automatic switching relation with a single gauge so that the gauge always indicates the highest pressure prevailing anywhere in the system.

U.S. Patent application Ser. No. 181,106 now U.S. Pat. No. 3,710,625 entitled, "Miniaturized Automatic Decompression Meters," in the names of Marcus P. Borom and Lyman A. Johnson, which discloses and claims the combination of a constant-volume gas chamber and a liquid-filled gauge which enables miniaturization without impairing performance of the instrument.

U.S. Patent application Ser. No. 181,096 now U.S. Pat. No. 3,759,101 entitled, "Combined Depth Gauge and Pneumatic Analogue Decompression Instrument," in the names of Marcus P. Borom and Lyman A. Johnson, which discloses and claims the concept of using a porous body both to provide the volume of the time-constant gas chamber and to provide support for the semi-permeable membrane and the gauge-sealing diaphragm. An additional novel feature is the coordinated depth gauge formed in the transparent cover of the instrument for read-out on the decompression meter dial.

BACKGROUND OF THE INVENTION

The major hazard faced by both commercial and sport divers is decompression sickness which results from the release of dissolved gases from the body tissues as discrete bubbles when the ambient pressure is reduced too rapidly. As the ambient pressure is increased during a dive, the body tissues begin to absorb more gas from the breathing mixture to equilibrate with this pressure change. The rate of such equilibration varies from tissue to tissue, but not significantly from person to person, nor between compression and decompression phases, and is vitally important only in the course of return from hyperbaric exposure. Also, the tissues can withstand, to varying degrees, an internal over-pressure (i.e., supersaturation) during decompression without nucleating gas bubbles. This is referred to as a tissue ratio and is given by the expression Tissue ratio = Safe maximum tissue pressure/ambient pressure with the pressures given on an absolute scale. The rate of descent, therefore, is a matter of the diver's choice while the rate of ascent is limited by a combination of the tissue ratio and the rate at which the dissolved gases enter the bloodstream in the dissolved state and are removed from the body through the lungs.

Boycott, Damant and Haldane ["The Prevention of Compressed-Air Illness," J. Hygiene, 8, 342–443 (1908)], proposed that the body tissues can be considered to be gas-diffusion chambers arranged in a parallel circuit with each chamber having a characteristic tissue half time and tissue ratio.

On the basis of their model, Boycott, et al. proposed a radical departure from the conventional continuous decompression schedules which became known as "stage" decompression. Today their model forms the basis for the modern decompression schedules as set forth in the Standard Navy Decompression Tables. These Tables have been computed using tissue half times of 20, 40, 80 and 120 minutes and tissue ratios from 2.5/1 to 1.8/1. These Tables are designed for fixed mission dives, that is, dives to a predetermined depth for a predetermined time. Consequently, they are not suitable for the majority of commercial and sport dives since they prescribe a longer-than-necessary decompression schedule as the alternative to hazarding an estimate compensating for depth excursions during a dive.

Recognizing the need for a better answer to the problem, the prior art provided decompression meters having input, computation and read-out components of various kinds. In these devices, however, computation is accomplished by the resistive flow of a gas through an orifice or a porous medium which follows the mathematics of Poiseuille flow and not diffusion through a membrane. These devices, then, share the characteristic of inability to compute minimum-duration safe decompression schedules according to the Boycott, et al. model. Thus, because of Poiseuille flow, tissue gas uptake and release actions are not computed according to the expression used in developing the accepted decompression tables. The use of a diffusion membrane provides the precise analogue to these expressions.

SUMMARY OF THE INVENTION

The decompression meter of this invention is similar to the versatile instruments of the aforementioned related patent applications, but includes a novel composite membrane assembly. Thus, in place of the gas-diffusion membrane element of those instruments, a multi-component structure is provided which performs the computing function of the membrane, gaskets adjacent parts of the instrument housing and prevents gas pressure differential displacement of the membrane. In this assembly, the membrane is sandwiched between two plastic screens, one (or both) of which is bonded to the membrane periphery by an annular plastic seal which in use of the instrument prevents undesired lateral gas flow in the membrane peripheral region. A perforate metal disc completes the assembly, covering the composite membrane and preventing its deflection while permitting free gas flow to and from the membrane surface.

This new composite membrane assembly enables the use of membrane materials which, although thinner and stronger than other such materials, are not preferred because of the close machining tolerances they require for adequate sealing.

DESCRIPTION OF THE DRAWINGS

The novel features and advantages of the instruments of this invention will be more clearly apparent from the detailed description set forth below taken in conjunction with the drawings accompanying and forming a part of this specification, in which:

FIG. 1 is a perspective view of an instrument embodying this invention in a preferred form, parts being broken away for clarity;

FIG. 2 is an enlarged, exploded, perspective view of the membrane assembly of the instruments of FIG. 1;

FIG. 3 is a view like that of FIG. 2 of another membrane assembly of this invention; and FIG. 4 is an enlarged, fragmentary sectional view of the computing components of the FIG. 1 instrument.

DETAILED DESCRIPTION OF THE INVENTION

Self-contained instrument 10 of FIG. 1 comprises an immersible three-part housing 11 of transparent, rigid, shape-maintaining plastic material, suitably Lexan polycarbonate resin. Upper or cover portion 12 is cup-shaped and has an annular flange 13. A second cup-shaped shell 14 having an outwardly-extending annular flange 15 and an axial aperture 16 is nested in cover 12 so that flange 13 rests on flange 15 and gauge compartment 17 is provided in the upper part of housing 11. Cover plate 18 is the housing base and has an axial aperture 19 serving as a water-pressure port. The housing members are secured liquid-tightly together by bolts 20 through flanges 13 and 15 and the peripheral portion of plate 18, a natural rubber diaphragm 21 being fastened in place between shell 14 and plate 18 and closing shell 14 to provide ambient-pressure gas chamber 22 therein.

Diaphragm 21 prevents entry of water into chamber 22 from waterpressure port 19, but is resiliently responsive to changes in water pressure in the port, deforming in chamber 22 and thereby changing its volume and correspondingly changing the pressure of gas sealed therein.

A bourdon tube instrument assembly 23 including a base 24 in the form of a shallow flanged cup is secured in gauge compartment 17 over aperture 16 so that instrument dial 25 is visible through the top of cover 12. The bourdon tube is connected to indicator 27 for movement in response to changes in pressure within time constant gas chamber 28 of the instrument assembly.

A composite gas-diffusion membrane assembly 30 is disposed in the lower portion of base 24 and bears sealingly against the top of shell 14 around aperture 16. This structure is shown to best advantage in FIG. 4.

The several component parts of assembly 30 are illustrated in the two alternative embodiments of FIGS. 2 and 3. Thus, in FIG. 2, gas-diffusion membrane 35 of suitable imperforate polymeric material in disc form and thickness preferably of the order of two mils is covered on its upper side by a first reinforcing plastic screen or mesh 36 of the same diameter. Screen 36 is joined around its periphery to membrane 35 by a suitable compatible bonding material which takes the form of a ring 37, as shown in FIG. 2, and serves to gasket membrane 35 against lateral gas flow between the membrane and metal retaining disc 40 secured within the open lower end of base 24 by means of an annular solder seal 41. Disc 40 is provided with a plurality of apertures 43 for gas flow between membrane 35 and chamber 28. A second reinforcing plastic screen 45 completes the FIG. 2 assembly and covers the lower surface of membrane 35 like screen 36 covers the membrane upper surface, but is not joined permanently to the membrane.

The FIG. 3 assembly similarly includes a membrane disc 50 and reinforcing plastic screens 51 and 52 covering the upper and lower surfaces of the membrane. However, instead of only one screen being joined to the membrane, both are so attached, providing ring seals 53 and 54. It is this form of assembly that is shown in FIG. 4.

In assembling instrument 10, rubber diaphragm 21 is mounted in place with chamber 22 containing air at normal atmospheric pressure and temperature. Likewise, membrane assembly 30 and bourdon tube instrument assembly 23 are mounted in place with time-constant or gauge chamber 28 containing air at normal atmospheric pressure and temperature, retaining disc 40 being soldered in place as the preliminary step in installing the composite membrane assembly.

The permselective or gas diffusion imperforate membranes employed in the devices of this invention are selected with regard to the composition of the breathing gas mixture. In the case of atmospheric air, a 2 mil-thick membrane of polycarbonate-silicone rubber block copolymer is preferred. This material is a block copolymer of dimethylsiloxane and polycarbonate, as described and claimed in U.S. Pat. No. 3,189,662 to Vaughn.

In the bonding material used to join membranes 35 and 50 to the reinforcing plastic (suitably nylon) screens may be any compatible adhesive material. Preferably, though, a silicone resin containing methyltrisiloxy and tetrasiloxy units is used. Such a sealing material is commercially-available on the market under the designation RTV-108 Silicone Seal and may be applied by silk screening techniques. The bourdon gauge of the illustrated instrument has a 1.5 inch diameter dial face and a 60 psi rating so that it allows decompression stops as deep as 50 feet to be indicated, and yet the size of the instrument is compatible with a wrist-worn device. The bourdon tube gauge chamber volume is approximately 0.15 cubic inch. Also, as indicated in the drawings, aperture 16 is of diameter about one-quarter inch and the diameter of time-constant chamber 28 is about five-eighth inch. This instrument consequently has an 80-minute half-time rating.

MODE OF OPERATION

When the illustrated instrument is carried through a diving excursion, the volume of ambient pressure gas chamber 22 fluctuates with changes in water pressure in port 19, diaphragm 21 being deformed by the pressure differential across it. An increase in gas pressure in chamber 22 results in a gas pressure differential across composite membrane assembly 30, which leads to diffusion of gas from chamber 22 into the time-constant chamber 28 and consequent proportional deflection of the bourdon tube. Indicator 27 is actuated by the bourdon tube deflection and the meter dial calibrated in feet of depth then indicates continuously the extent of body tissue gas uptake in terms of the required decompression stop depths. During decompression, the device programs, via pressure decay in chamber 28, a safe decompression schedule of minimum duration for tissues having a time-constant characteristic matched by gas-diffusion membrane 35 or 50. In other words, the gas-diffusion effect is reversible and repetitious so that for a selected time-constant tissue full account is taken automatically of all the different times-at-depth experienced on a random depth-course dive. In addition, the residual pressure in time-constant chamber 28 when the diver reaches the surface provides the device with a memory for decompression calculations during a repetitive dive. These important functions and features are multiplied in accordance with the invention disclosed and claimed in copending application Ser. No. 181,107 referred to above to provide a versatile instrument in which a number of different time-constant tissues are separately matched by different time-constant diffusion-membrane chambers. That instrument consequently can automatically compute minimum-duration safe decompression schedules for dives of widely varying times and depths in which different decompression-rate limitations are imposed by dissimilar time-constant tissues. Accordingly, it is contemplated that the composite gas-diffusion membrane assembly of the present invention may be used in place of each membrane assembly of the devices of the said copending application.

As stated in my copending application Ser. No. 181,048, the mathematical expression used in the computation of the U.S. Navy diving tables is $$P_A - P/P_A - P_O = e^{-t/\zeta}$$

where
$P_A$ is the absolute ambient pressure
$P_O$ is the absolute initial pressure in the tissue
$P$ is the absolute instantaneous tissue pressure
$t$ is the time
$\tau$ is the tissue time constant The time constant, $\tau$, is given by the expression $$\tau = V \cdot X/A \cdot \phi$$

where
V is the constant chamber volume
X is the membrane thickness
A is the membrane area
$\phi$ is the membrane permeability A plot of $ln\ P_A - P/P_A - P_O$ vs. time at any constant ambient pressure should produce a single straight line whose slope is given by $-1/\tau$. The data for my present device utilizing the new composite gas-diffusion membrane assembly yields the exact analogue of this expression and produces the specified linear plot.

What I claim as new and desire to secure by Letters Patent of the United States is:

1. In a decompression meter for use in SCUBA diving including a submersible housing providing an ambient pressure gas chamber and a time-constant gas chamber and a passageway communicating with said gas chambers, the combination of a gas diffusion membrane assembly closing the passageway to the free flow of gas from one said chamber to the other and providing gasketing between separate parts of the meter housing, said assembly consisting of
   a. an imperforate air-permeable sheet of polymeric material,
   b. a first reinforcing screen of plastic material covering one side of the imperforate sheet,
   c. gasket means for the meter housing comprising an annular band of plastic bonding material carried on the periphery of the first reinforcing screen and bonded to the imperforate sheet,
   d. a second reinforcing plastic screen contacting and covering the other side of the imperforate sheet and bearing against the housing around the time-constant gas chamber end of the passageway to prevent gas pressure differential displacement of the imperforate sheet and reinforcing screens in the direction of the ambient pressure gas chamber, and
   e. a perforate metal disc air-tightly joined around its periphery to the housing by an annular solder seal and covering the time-constant chamber side of the first reinforcing screen and bearing in compression against the opposed annular surface of the gasket means around its periphery to prevent gas leakage around the edge of the membrane and also to prevent gas pressure differential displacement of the imperforate sheet and the reinforcing screens in the direction of the time-constant gas chamber.

* * * * *